3,032,563
16-ETHYNYLATED STEROID COMPOUNDS AND PROCESS FOR THEIR PRODUCTION

Georges Muller, Nogent-sur-Marne, and Leon Velluz, Paris, France, assignors, by mesne assignments, to Roussel-UCLAF, S.A., Paris, France, a corporation of France
No Drawing. Filed May 11, 1960, Ser. No. 28,250
Claims priority, application France June 4, 1959
13 Claims. (Cl. 260—397.3)

The present invention relates to 16-ethynylated steroid compounds as well as the process for their production. It relates especially to 16α-ethylated compounds of the general formula

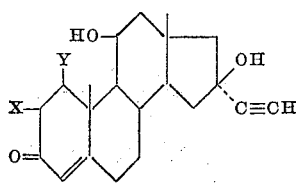

wherein X and Y equal H or together represent a double bond in the 1,2-position and, more particularly, to 16α-ethynyl - 3 - keto - 11β,16β - dihydroxy - $\Delta^4$ - androstene and 16α - ethynyl - 3 - keto - 11β,16β - dihydroxy - $\Delta^{1,4}$-androstadiene.

In the copending, commonly-assigned U.S. application Serial No. 3,168 there is described a process for the production of the 11-oxygenated-17-ethynyl-$\Delta^{1,4}$-androstadienolones. It is known (Velluz et al., J. Am. Chem. Soc., 1958, vol. 80, page 2026) that these compounds are endowed with a very interesting antilipemic activity. It has now been found that the products of the invention possess an even more important antilipemic activity which appears to manifest itself selectively against β-lipoproteins, the amount of which in the blood stream are lowered after treatment with the products of the invention. It is surprising to ascertain in the present case, that a change of the hydroxyl and ethynyl functions from the 17-position to the 16-position has not destroyed the physiological action, but, to the contrary, has augmented it to such a point that the presence of the double bond in the 1,2-position is no longer indispensable as was thought previously. 16α - ethynyl - 3 - keto - 11β,16β-dihydroxy-$\Delta^4$-androstene of the present invention possesses, in fact, an antilipemic activity similar to that of 17α - ethynyl - 3 - keto - 11β,17β - dihydroxy - $\Delta^{1,4}$-androstadiene, previously reported.

It is an object of the invention to produce novel steroid compounds which are useful pharmaceutical agents, possessing a selective antilipemic activity.

A further object of the invention is to produce the 16α-ethynylated steroid compounds by a novel sequence of steps.

Another object of the invention is to produce 16α-ethynyl - 3 - keto - 11β,16β - dihydroxy - $\Delta^4$ - androstene and 16α-ethynyl-3-keto-11β,16β-dihydroxy-$\Delta^{1,4}$-androstadiene.

It is another object of the invention to provide these new intermediates: 16-oximino-3,11,17-triketo-$\Delta^4$-androstene; 3,11,16-triketo-17-hydroxy-$\Delta^4$-androstene; the p-toluene sulfonate of 3,11,16-triketo-17-hydroxy-$\Delta^4$-androstene; the 3-ethyl ether of the p-toluene sulfonate of 11,16-diketo-17-hydroxy-$\Delta^{3,5}$-androstadiene; the 3-ethyl ether of the 17-p-toluene sulfonate of 11β,16,17-trihydroxy-$\Delta^{3,5}$-androstadiene; the 3-ethyl ether of 16-keto-11β-hydroxy-$\Delta^{3,5}$-androstadiene; and the 3-ethyl ether of 16α - ethynyl - 11β,16β - dihydroxy - $\Delta^{3,5}$ - androstadiene.

These and other objects and advantages of the invention will become more obvious from the following detailed description.

The process of the present invention consists essentially of treating adrenosterone with a lower alkyl nitrite in an appropriate solvent, isolating 16-oximino-3,11,17-triketo-$\Delta^4$-androstene, reducing it into 3,11,16-triketo-17-hydroxy-$\Delta^4$-androstene by treatment with zinc in acetic acid, esterifying it with p-toluene sulfonyl chloride in pyridine, isolating the p-toluene sulfonate of 3,11,16-triketo-17-hydroxy-$\Delta^4$-androstene, preparing the 3-enolic ethyl ether of this compound by the action of ethyl orthoformate in ethanol and in the presence of sulfuric acid, reducing the ketone functions in the 11-position and 16-position into 11β,16-hydroxyl functions by the action of an alkali metal borohydride, effecting the cleavage of the 17-p-toluene-sulfonyloxy group by heating under alkaline conditions, reacting acetylene with the 3-ethyl ether of 16-keto-11β-hydroxy-$\Delta^{3,5}$-androstadiene thus obtained in the presence of an alcoholate of an alkali metal, heating in an acid medium so as to transform the enol ether back to the $\Delta^4$-3-ketone and introducing, if desired, the second double bond in the 1,2-position by microbiological means.

The process of the invention follows the series of steps set forth in Table I.

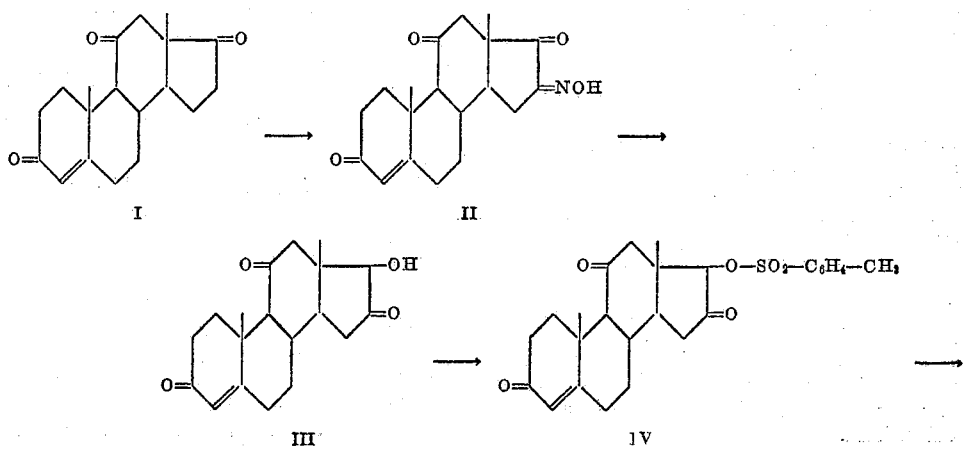

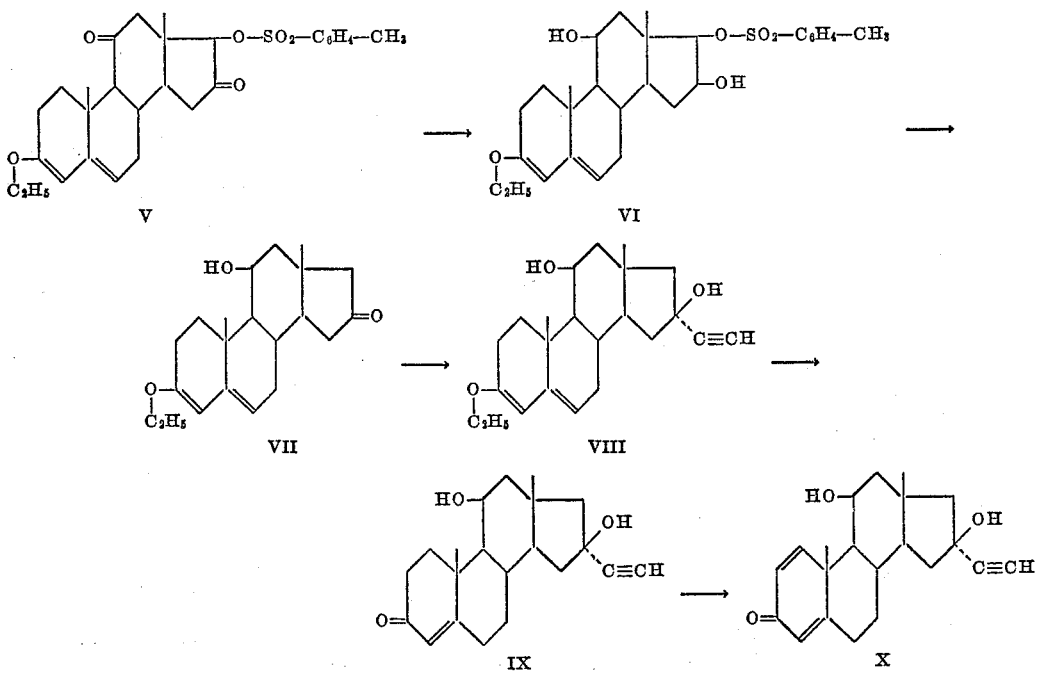

According to the preferred mode of operation of the process of the invention, the adrenosterone is treated with t-butyl nitrite in a lower alkanol such as t-butanol and in the presence of an alkali metal lower alkanolate such as potassium t-butylate, the ketone function in the 11-position is reduced by the action of sodium borohydride, the cleavage of the 17-p-toluene sulfonyloxy group is effected by heating in the presence of ethanolic sodium hydroxide, the acetylene is reacted in the presence of potassium t-butylate in t-butanol, the enol ether is hydrolyzed by heating an aqueous acetic acid and the double bond is introduced into the 1,2-position by the action of *Corynebacterium simplex*.

In the following examples there are described several preferred embodiments to illustrate the invention. However, it should be understood that the invention is not intended to be limited to the specific embodiments. The melting points are instantaneous melting points determined on a Kofler block.

EXAMPLE 1

*Production of 16-Oximino-3,11,17-Triketo-Δ⁴-Androstene (II)*

7.2 gm. of adrenosterone (I) are dissolved in 35 cc. of methylene chloride. 7.2 cc. of t-butyl nitrite are added and then, while maintaining the temperature around 0° C., 29 cc. of a normal solution of potasisum t-butylate in t-butanol are added. The mixture is agitated for 10 minutes at 0° C., 200 cc. of iced water are added, then 70 cc. of methylene chloride are added and decanted. The organic phase is washed with 1 N sodium hydroxide and discarded. The aqueous liquors are combined, acidified to a pH of 1 with hydrochloric acid and extracted with methylene chloride. The organic solutions are combined, washed with water, dried with magnesium sulfate and evaporated to dryness in vacuo. The residue is taken up in 30 cc. of ethyl acetate and allowed to stand until crystallization takes place to obtain, after vacuum filtering and drying, 4.260 gm. (that is 54% of theory) of 16-oximino-3,11,17-triketo-Δ⁴-androstene (II), melting point about 300° C., specific rotation $[\alpha]_D^{20} = +130°$ (c.=0.25%, pyridine). This new product is obtained in the form of small yellow crystals, insoluble in water and ether, slightly soluble in alcohol, soluble in chloroform.

Analysis: $C_{19}H_{23}O_4N$; molecular weight=329.38. Calculated: C, 69.28%; H, 7.04%; N, 4.25%. Found: C, 69.5%; H, 6.9%; N, 4.8%.

EXAMPLE 2

*Production of 3,11,16-Triketo-17-Hydroxy-Δ⁴-Androstene (III)*

4.8 gm. of 16-oximino-3,11,17-triketo-Δ⁴-androstene (II), obtained according to the preceding example, is put into suspension, in a mixture of 48 cc. of acetic acid and 48 cc. of water. While agitating, 9.6 gm. of powdered zinc are added thereto and the mixture is boiled for thirty minutes. It is cooled to 20° C., filtered, 250 cc. of water added, and extracted with methylene chloride. The extracts are washed with water, and with sodium bicarbonate, and then they are dried over magnesium sulfate and evaporated to dryness in vacuo. The residue is dissolved in 30 cc. of a mixture of ethyl acetate and ether (4:6) and allowed to stand until crystallization takes place. Thus, 3.5 gm. (76% of theory) 3,11,16-triketo-17-hydroxy-Δ⁴-androstene (III) are obtained. This product, which has not yet been described, is obtained in the form of small bright-yellow crystals, which are insoluble in water, very slightly soluble in ether, soluble in alcohol, acetone and chloroform, melting point 200° to 202° C., specific rotation $[\alpha]_D^{20} = +50°$ (c.=0.5%, chloroform).

Analysis: $C_{19}H_{24}O_4$; molecular weight=316.38. Calculated: C, 72.1%; H, 7.65%. Found: C, 72.3%; H, 7.7%.

EXAMPLE 3

*Production of the p-Toluene Sulfonate of 3,11,16-Triketo-17-Hydroxy-Δ⁴-Androstene (IV)*

5 gm. of 3,11,16 - triketo-17-hydroxy-Δ⁴-androstene (III), obtained according to the preceding example, are dissolved in 20 cc. of pyridine, and 6 gm. of p-toluene sulfonyl chloride are added thereto. The solution is allowed to stand for 16 hours at room temperature, 10 cc. of water are added, and the solution is allowed to stand for 30 minutes. Then the solution is diluted with methylene chloride, washed with 2 N hydrochloric acid, with water, with sodium bicarbonate, dried over magnesium sulfate and concentrated in vacuo until the crystallization begins. 150 cc. ether are added and the solution is concentrated to 60 cc., iced and vacuum filtered to obtain, after drying, 7.05 gm. (that is 94% of theory) of the p-toluene sulfonate of 3,11,16-triketo-17-hydroxy-Δ⁴-androstene (IV). The product, which is new, is obtained in the form of small colorless crystals, insoluble in water and ether, soluble in acetone and in chloroform, melting point 150° C., then 230° C., specific rotation $[\alpha]_D^{20} = -17°$ (c.=0.5%, chloroform).

Analysis: $C_{16}H_{30}O_6S$; molecular weight=470.50. Calculated: C, 66.37%; H, 6.43%; S, 6.8%. Found: C, 66.3%; H, 6.4%; S, 6.9%.

EXAMPLE 4

*Production of the 3-Ethyl Ether of the p-Toluene Sulfonate of 11,16-Diketo-17-Hydroxy-Δ³,⁵-Androstadiene (V)*

7 gm. of the p-toluene sulfonate of 3,11,16-triketo-17-hydroxy-Δ⁴-androstene (IV), obtained according to the preceding example, in 35 cc. of ethanol and 7 cc. of ethyl orthoformate are heated to reflux. 1.5 cc. of a mixture of 0.1 cc. of concentrated sulfuric acid and 50 cc. of ethanol are added and the solution is boiled for three minutes. 1.5 cc. of triethylamine are then added. The mixture is iced, diluted with methylene chloride, washed with water, dried over magnesium sulfate and evaporated to dryness in vacuo. Thus, the 3-ethyl-ether of the p-toluene sulfonate of 11,16-diketo-17-hydroxy-Δ³,⁵-androstadiene (V) is obtained, which can be used directly in this form for the following stage of the synthesis. This product is new.

EXAMPLE 5

*Production of the 3-Ethyl Ether of the 17-p-Toluene Sulfonate of 11β,16,17-Trihydroxy-Δ³,⁵-Androstadiene (VI)*

The enol ether V, obtained according to the preceding example, is dissolved in 35 cc. of methylene chloride and 70 cc. of methanol. 7 gm. of sodium borohydride are added and the solution is agitated for 2 hours and 30 minutes at a temperature of 20 to 22° C. 300 cc. of water are poured into the solution and it is diluted with methylene chloride, washed with water, dried over magnesium sulfate and evaporated to dryness in vacuo. The enol ether VI thus obtained, which has not yet been described, is used directly without any purification for the next stage of the synthesis.

EXAMPLE 6

*Production of the 3-Ethyl Ether of 16-Keto-11β-Hydroxy-Δ³,⁵-Androstadiene (VII)*

The enol ether VI, obtained according to the preceding example, is dissolved in 70 cc. of ethanol, 7 cc. of sodium hydroxide are added, and the solution is boiled for one hour.

500 cc. of water are added thereto, and the mixture is vacuum filtered. The filter cake is washed with water, and the product is redissolved in 200 cc. of ether. The solution is dried over magnesium sulfate, concentrated to 10 cc. and 60 cc. isopropyl ether are added. The solution is iced and vacuum filtered. The filter cake is dried at 100° C. and 3.08 gm. (63% of theory) of the enol ether VII are thus obtained. The product, which is new, is obtained in the form of small yellow crystals insoluble in water, slightly soluble in ether and isopropyl ether, soluble in acetone, benzene and chloroform. The melting point is 174° C., specific rotation $[\alpha]_D^{20}=-281°$ (c.=0.5%, ethanol containing 10% pyridine).

Analysis: $C_{21}H_{30}O_3$; molecular weight=330.45. Calculated: C, 76.32%; H, 9.15%. Found: C, 76.4%; H, 9.2%.

EXAMPLE 7

*Production of the 3-Ethyl Ether of 16α-Ethynyl-11β, 16β-Dihydroxy-Δ³,⁵-Androstadiene (VIII)*

A stream of acetylene is passed into 30 cc. of a normal solution of potassium t-butylate in t-butanol for 30 minutes at room temperature. 30 cc. of benzene and then 1 gm. of the enol ether, VII, prepared according to the preceding example, are added thereto, and a stream of acetylene is passed through the solution for six hours at room temperature. The mixture is acidified to a pH of 5 with acetic acid, diluted with methylene chloride, washed with water and with sodium bicarbonate, dried over magnesium sulfate and evaporated to dryness in vacuo. Thus, the enol ether, VIII, is obtained which is novel and is used directly, without additional purification, for the next stage of the synthesis.

EXAMPLE 8

*Production of 16α-Ethynyl-3-Keto-11β,16β-Dihydroxy-Δ⁴-Androstene (IX)*

The enol ether, VIII, obtained according to the preceding example, is heated on a water bath for 15 minutes in a mixture of 5 cc. of pure acetic acid and 0.5 cc. of water. The solution is allowed to stand overnight in a refrigerator and is vacuum filtered to obtain, after drying, 0.417 gm. (42% of theory) of 16α-ethynyl-3-keto-11β,16β hydroxy-Δ⁴-androstene, IX.

The product, which has not yet been described, is obtained in the form of small colorless crystals, insoluble in water and ether, slightly soluble in benzene, chloroform and methylene chloride. Melting point=270° C., specific rotation $[\alpha]_D^{20}=+85°$ (c.=0.5%, dioxane).

Analysis: $C_{21}H_{28}O_3$; molecular weight=328.44. Calculated: C, 76.6%; H, 8.6%. Found: C, 76.5%; H, 8.5%.

EXAMPLE 9

*Production of 16α-Ethynyl-3-Keto-11β,16β-Dihydroxy-Δ¹,⁴-Androstadiene (X)*

A culture, aged for 24 hours, was prepared from *Corynebacterium simplex* (ATCC 6946) in a nutritive medium composed of 100 cc. of an extract of 0.1% yeast containing 9 cc. of a 0.2 M solution of potassium acid phosphate and 9 cc. of a 0.2 M solution of sodium acid phosphate. A solution of 150 mgm. of 16α-ethynyl-3-keto-11β,16β-dihydroxy-Δ⁴-androstene (IX), obtained according to the preceding example, in 5 cc. of ethanol is added. The mixture is stirred for 48 hours at 28° C. The solution is extracted with methylene chloride, washed with water, dried over magnesium sulfate and evaporated to dryness in vacuo to obtain 80 mgm. 16α-ethynyl-3-keto-11β,16β-dihydroxy-Δ¹,⁴-androstadiene (X).

The product, which is new, is obtained in the form of small colorless crystals.

The infra-red spectra values confirm its structure.

The above examples do not limit the invention. Particularly, it is possible to vary the temperatures, the order of introduction of the reagents, and the duration of the reactions without departing from the scope of the invention. The utilization of techniques equivalent to the procedures used herein are also a part of the invention. The scope of the invention is to be construed by the appended claims.

We claim:

1. A compound of the formula

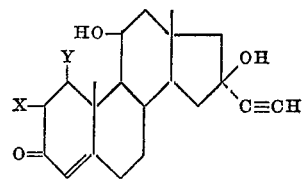

wherein X and Y are selected from the group consisting of hydrogen and a double bond in the 1,2-position.

2. 16α-ethynyl-3-keto-11β,16β-dihydroxy-Δ⁴-androstene.

3. 16α - ethyl - 3 - keto - 11β,16β - dihydroxy-Δ¹,⁴-androstadiene.

4. 16-oximino-3,11,17-triketo-Δ⁴-androstene.

5. The 3-ethyl ether of 16-keto-11β-hydroxy-Δ³,⁵-androstadiene.

6. The 3-ethyl ether of 16α-ethynyl-11β,16β-dihydroxy-Δ³,⁵-androstadiene.

7. A process for the production of 16α-ethynylated compounds of the formula

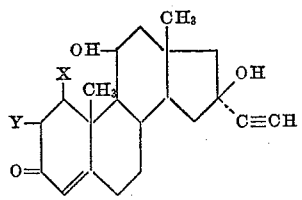

wherein X and Y are selected from the group consisting of hydrogen and a double bond in the 1,2-position which comprises treating adrenosterone with a lower alkyl nitrite in a lower alkanol, isolating 16-oximino-3,11-17-triketo-Δ⁴-androstene, reducing the latter in the 17-position by treatment with zinc in acetic acid, esterifying the reduced product with p-toluene sulfonyl chloride in pyridine to form the p-toluene sulfonate of the reduced product, reacting the said p-toluene sulfonate with ethyl orthoformate in ethanol and in the presence of sulfuric acid to effect enolization, reducing the ketone groups in the 11 and 16-positions into hydroxy groups by action of an alkali metal borohydride, heating the reduced product under alkaline conditions to cleave the 17-p-toluene sulfonyloxy group and to obtain the 3-ethyl ether of 16-keto-11β-hydroxy-Δ³,⁵-androstadiene, reacting said ethyl ether with acetylene in the presence of an alkali metal lower alkanolate to form the 3-ethyl ether of 16α-ethynyl-11β,16β-dihydroxy-Δ³,⁵-androstadiene, heating said 3-ethyl ether in an acid medium to transform the ether into a Δ⁴-3-ketone, and recovering said 16α-ethynylated compounds.

8. The process of claim 7 in which adrenosterone is treated with t-butyl nitrite in t-butanol and in the presence of potassium t-butylate.

9. The process of claim 7 in which the ketone groups in the 11 and 16-positions are reduced by the action of sodium borohydride in an inert organic solvent.

10. The process of claim 7 in which the cleavage of the 17-p-toluene sulfonyloxy group is effected by heating in the presence of ethanol and sodium hydroxide.

11. The process of claim 7 in which the acetylene is reacted in the presence of potassium t-butylate in t-butanol.

12. The process of claim 7 in which the transformation of the ether is achieved by heating in aqueous acetic acid.

13. The process of claim 7 in which 16α-ethynyl-3-keto-11β,16β-dihydroxy-Δ¹,⁴-androstadiene is recovered by subjecting 16α-ethynyl-3-keto-11β,16β-dihydroxy-Δ⁴-androstene to the action of *Corynebacterium simplex* whereby a double bond is introduced into the 1,2-position.

No references cited.

UNITED STATES PATENT OFFICE

CERTIFICATE OF CORRECTION

Patent No. 3,032,563

May 1, 1962

Georges Muller et al.

It is hereby certified that error appears in the above numbered patent requiring correction and that the said Letters Patent should read as corrected below.

Column 5, line 8, for "$C_{16}$" read -- $C_{26}$ --; column 6, line 22, for "-11β,16β hy-" read -- -11β,16β-dihy- --; line 73, for "-ethyl-" read -- -ethynyl- --.

Signed and sealed this 11th day of September 1962.

(SEAL)
Attest:

ERNEST W. SWIDER
Attesting Officer

DAVID L. LADD
Commissioner of Patents